US005214271A

United States Patent [19]

Rogers et al.

[11] Patent Number: 5,214,271

[45] Date of Patent: May 25, 1993

[54] METHOD OF DETERMINING DETECTOR LIFETIME USING A STEPPED RESISTOR NETWORK

[75] Inventors: Richard E. Rogers, Kettering; Larry D. Turvy, Jr., Bellbrook; George J. Eberhardt, Centerville; Richard E. Loughman, Bellbrook, all of Ohio

[73] Assignee: NCR Corporation, Dayton, Ohio

[21] Appl. No.: 971,804

[22] Filed: Nov. 5, 1992

Related U.S. Application Data

[62] Division of Ser. No. 672,800, Mar. 21, 1991, Pat. No. 5,187,374.

[51] Int. Cl.[5] .................. G01J 1/32

[52] U.S. Cl. .................. 250/205; 250/561

[58] Field of Search .................. 250/205, 561; 315/151, 315/291, 307

[56] References Cited

U.S. PATENT DOCUMENTS

| | | | |
|---|---|---|---|
| 4,359,670 | 11/1982 | Hosaka et al. | 315/307 |
| 4,416,524 | 11/1983 | Takayama | 315/151 |
| 4,593,194 | 6/1986 | Graham et al. | 250/205 |
| 4,701,669 | 10/1987 | Head et al. | 250/205 |
| 5,021,676 | 6/1991 | Dragon et al. | 250/561 |

*Primary Examiner*—David C. Nelms
*Assistant Examiner*—John R. Lee
*Attorney, Agent, or Firm*—Elmer Wargo

[57] ABSTRACT

A method and apparatus for sensing the presence of a document moved to a printing station in a printer and for detecting skewness (if any) of the document at the printing station. A first light-detector pair and a second light-detector pair are used, with the sensitivity of each of the detectors in the light-detector pairs being adjusted each time the printer is turned on. A controller and a stored program are used to adjust the sensitivity of the detector along with a resistor network providing steps of resistance. The particular resistance step to which a detector is adjusted also gives a measure of the useful life left for the detector.

2 Claims, 5 Drawing Sheets

METHOD OF DETERMINING DETECTOR LIFETIME USING A STEPPED RESISTOR NETWORK

This is a division of application Ser. No. 07/672,800, filed Mar. 21, 1991 now U.S. Pat. No. 5,187,374.

BACKGROUND OF THE INVENTION (1) Field of the Invention

This invention relates to a method and apparatus for optically sensing the presence of an object, like a sheet of paper, at a working location, like a print station, in a machine, like a printer, and it also relates to a method and apparatus for determining the skewness, if any, of the object in being fed to the working location.

(2) Background Information

There are several problems associated with feeding an object to a working location. For example, in the printer art, some of these problems are as follows:

(a) The sensing and aligning of various widths of forms. Because of the various widths of forms, it is difficult to use standard interrupter modules. The sensors used in the modules need to be mounted in such a manner as to detect the smallest forms without interfering with the detection of the largest forms.

(b) The sensing and aligning of documents having varying thicknesses. This is one of the most difficult problems to overcome with fixed gain optical systems in printers. The manufacturing variations such as alignment, parameter variations, dust, scratches, and degradation of the optical parts in the optical systems can cause degradation errors. This problem is compounded when the optical parts or light source detector pairs are mounted on separate moveable parts of the printer.

(c) The lifetime degradation of components and system. Another difficult problem is that of designing a system critical enough to sense all thicknesses of objects from very thin to very thick paper, for example, and to maintain the stability of the system through mechanical alignment change, component degradations, dust collection, and other life factors.

(d) Special design problems. In some situations, it is necessary that the item being moved be moved beyond the point at which its leading edge is detected. This problem precludes the use of standard interrupter devices which would be mounted in the path of the item being moved and thereby prevent movement of the item beyond the interrupter devices.

SUMMARY OF THE INVENTION

An object of this invention is to provide an optical sensing apparatus which obviates the problems mentioned above.

Another object of this invention is to provide such an apparatus which is easy to manufacture and which is low in cost.

An advantage of this invention is that the life of the sensors used in the apparatus can also be determined as the sensors get older in use.

Another advantage is that the sensors used are adjusted each time a terminal in which they are used is turned on.

In a first aspect of the invention there is provided an apparatus comprising:

at least one light source and light detector mounted in opposed relationship in said apparatus to form a light-detector pair for detecting the presence of an object moved therebetween;

a control means including a processor, a memory, and a program stored in said memory; said program controlling said apparatus after start up of said control means; and adjustment means for adjusting the sensitivity of said light detector each time during start up of said control means.

In another aspect of the invention there is provided a method of adjusting the sensitivity of a detector used in association with a light source, comprising the steps of:

(a) using a program stored in a memory and a processor for selecting the highest resistance from a stepped resistance network and placing the highest resistance in series with said light source;

(b) repetitively selecting a next lower resistance from said stepped resistance network until enough current flows through said light source to generate an output from said detector;

(c) selecting at least one step more of lower resistance from said stepped resistance network to adjust the sensitivity for said detector; and (d) repeating steps (a), (b), and (c) each time said processor is turned on.

The above advantages, and others, will be more readily understood in connection with the following specification, claims and drawing.

DESCRIPTION OF THE PREFERRED EMBODIMENT

In a first aspect, this invention relates to a method and apparatus for optically sensing the presence of an object, like a sheet of paper, at a working location. A terminal, like a printer 10 (FIG. 1) is selected to portray this invention.

Figure 1:
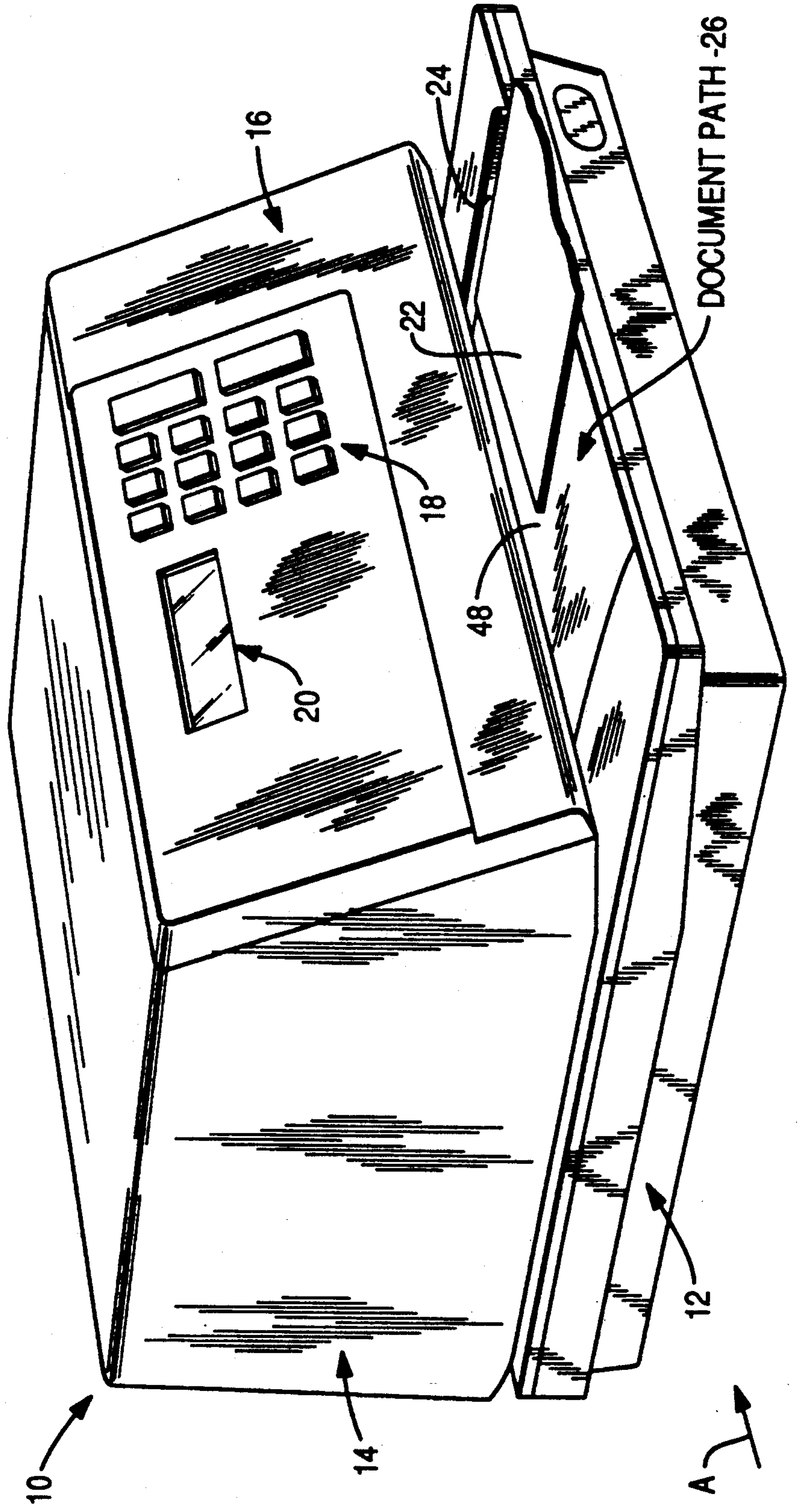
FIG. 1 is a general perspective view of a terminal, like a printer, in which a preferred embodiment of this invention may be used.

The printer 10 includes a bottom portion 12 and a top portion 14 which are shown in the normal operating or assembled position in FIG. 1. The top portion 14 of the printer 10 also includes a panel 16 which includes a keyboard 18 and a display 20. A document 22 to be printed upon is aligned against a guide wall 24 to move the document 22 in a feeding direction or along a document path 26 to a print station 28 shown best in FIG. 2.

Figure 2:
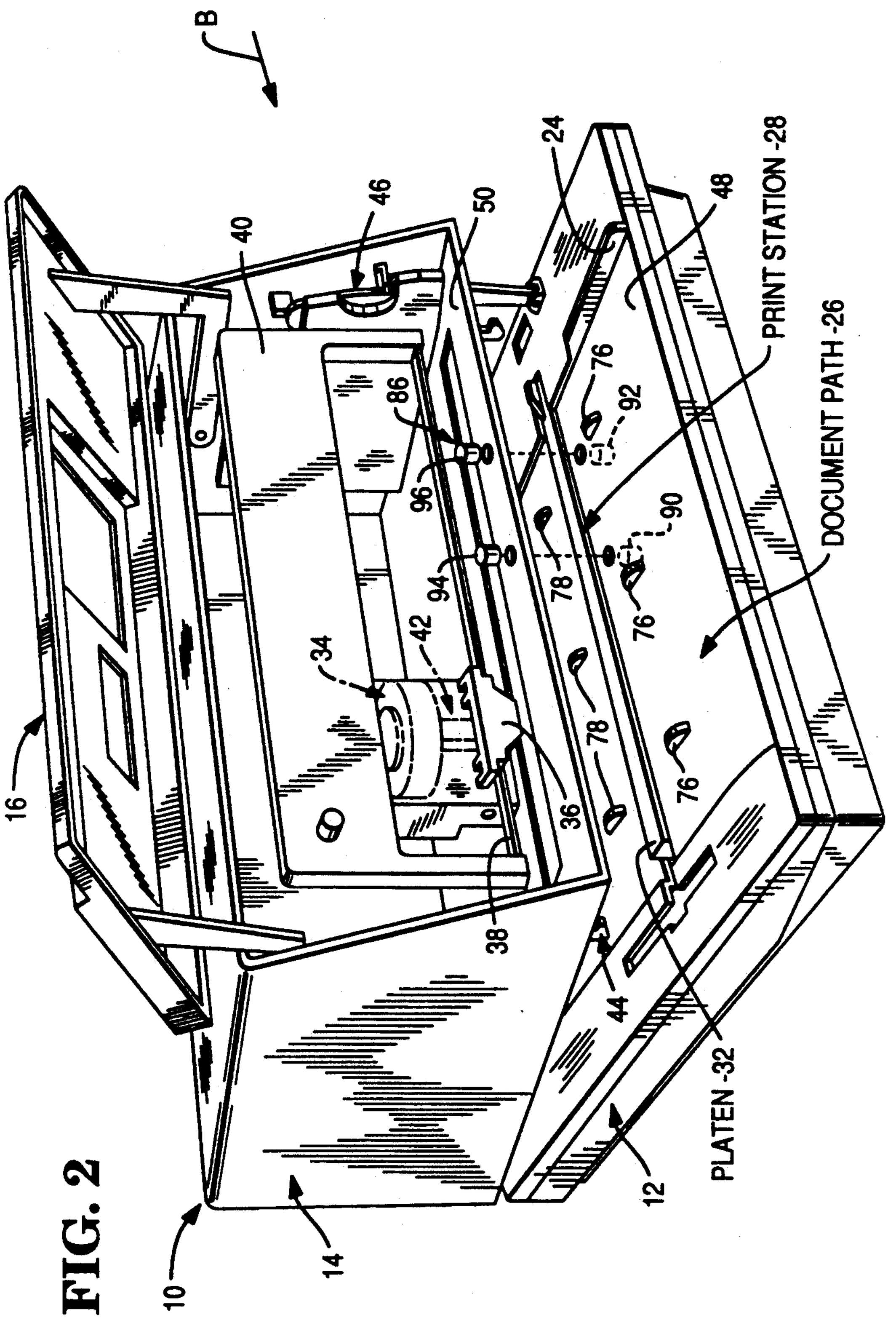
FIG. 2 is a general perspective view of the printer shown in FIG. 1, with a top portion of the printer moved away from a bottom portion thereof so as to show a print station in the interior of the printer.
Figure 3:
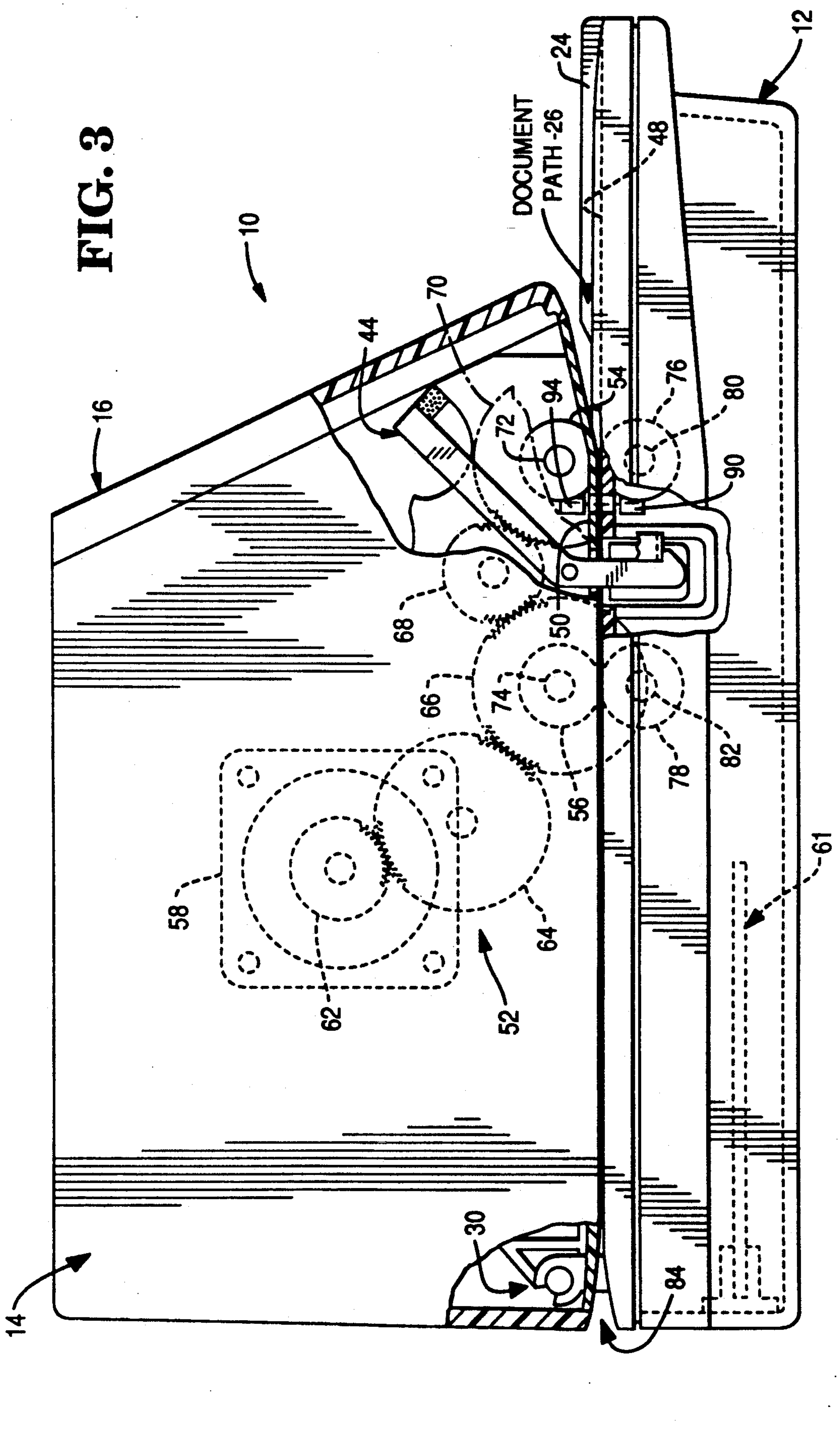
FIG. 3 is a side view, in elevation, of the printer shown in FIG. 1, and is taken from the direction of arrow A in FIG. 1.

FIG. 2 shows the top portion 14 of the printer 10 pivoted away from the bottom portion 12 by a pivot construction 30 (FIG. 3) to expose the print station 28, a floating platen 32, a print head 34, and a ribbon guide 36. The ribbon 38 from a ribbon cassette 40 passes through the ribbon guide 36 to supply inked ribbon in a routine manner. The print head 34 and the ribbon guide 36 are mounted on a carriage 42 which is moved along the platen 32 in printing relationship therewith. The construction of the print head 34 and its use in printing is conventional.

When the top portion 14 of the printer 10 is raised to the position shown in FIG. 2, there are conventional brackets, like 44 and 46 which hold it in that position until it is lowered to the operating position shown in FIG. 1. When the top portion 14 is pivoted or raised to the position shown in FIG. 2, any document or paper jams which might occur at the print station 28 can be removed more easily than from printers not having this pivoting feature. Having the top portion 14 pivoting away from the bottom portion 12 in this manner presents alignment problems when one half of a light-detect pair is mounted in the bottom portion 12 and the remaining half is mounted in the top portion 14. The panel 16 of the printer 10 can also be pivoted from the position shown in FIG. 1 to the position shown in FIG. 2 to gain access to the interior of the printer 10.

The printer 10 also includes a lower or first guide 48 (FIG. 3) which is part of the lower portion 14 and an upper or second guide 50 which is part of the top portion 14. These first and second guides 48 and 50 are mounted in spaced parallel relationship to each other when the printer 10 is in the assembled relationship shown in FIG. 3, for example.

Figure 4:
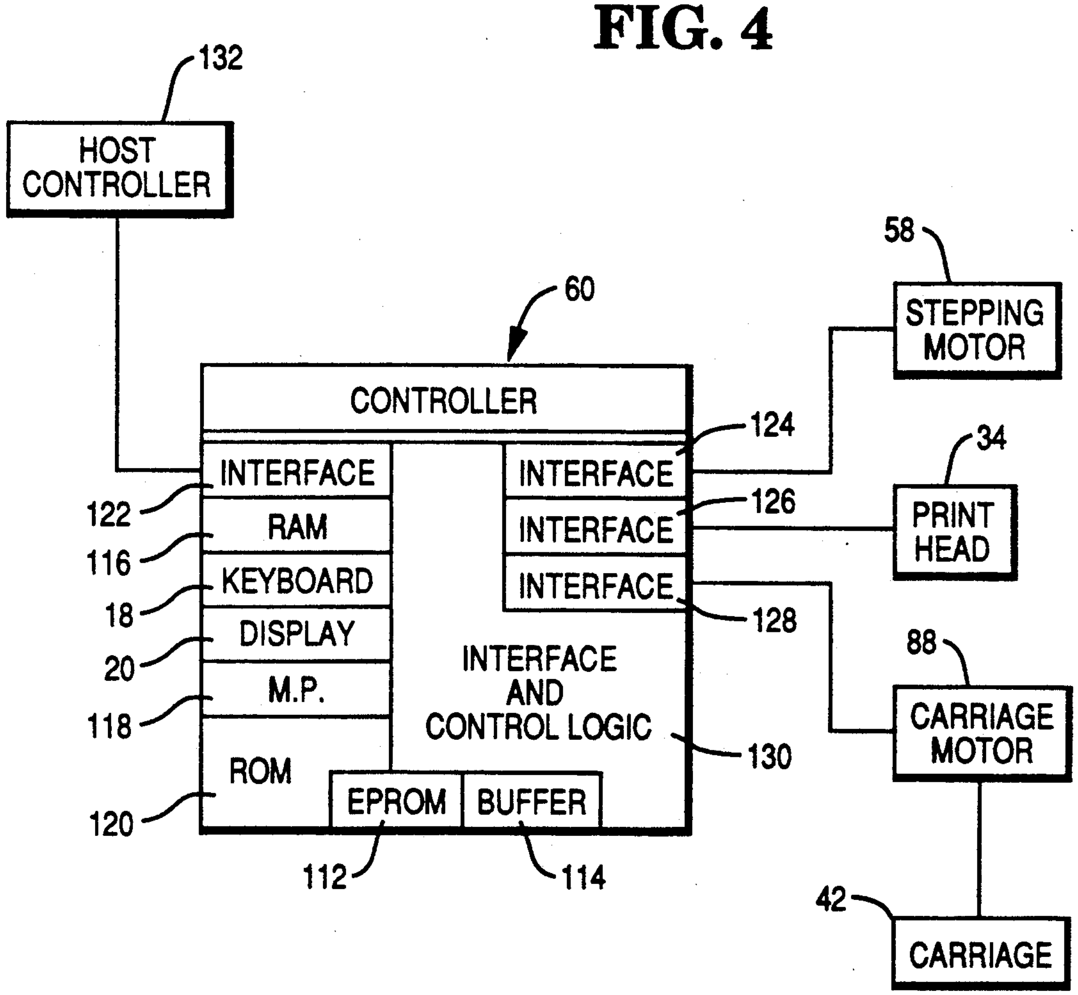
FIG. 4 is a schematic diagram showing a controller used with the printer shown in FIG. 1.

The printer 10 also includes a feeding means 52 (FIG. 3) for feeding the document 22 to the print station 28. The feeding means 52 includes a first bank of feed rollers 54 and a second bank of feed rollers 56. These feed rollers 54 and 56 are driven by a stepping motor 58 which is under the control of a control means or controller 60 shown in FIG. 4. The stepping motor 58 has an output gear 62 which drives or rotates a gear 64, which in turn drives a gear 66. An idler gear 68 is used to transfer the rotary motion to a gear 70 which is pinned to a shaft 72. The feed rollers 54 are also fixed to the shaft 72 to rotate therewith, and similarly, the feed rollers 56 are pinned to a shaft 74 to rotate therewith. Gear 66 is fixed to shaft 74 to rotate therewith. With the gearing just described, the feed rollers 54 and 56 rotate together in the same direction whenever the stepping motor 58 is energized by the controller 60.

The feeding means 52 (FIG. 3) also includes a first group of pinch rollers 76 and a second group of pinch rollers 78. The pinch rollers 76 are rotatably mounted on a rod 80, and similarly, the pinch rollers 78 are rotatably mounted on a rod 82. The rods 80 and 82 are spring biased upwardly, as viewed in FIG. 3, so as to bias the pinch rollers 76 and 78 into engagement with their associated feed rollers 54 and 56, respectively, so as to feed the document 22 therebetween. The document 22 may be a sheet of paper or it may be a passbook, for example. The first and second guides 48 and 50 extend along the length of the printer 10 so that the leading edge of the document 22 can extend out the rear 84 of the printer 10, if necessary, when the trailing edge of the document 22 is to be positioned at the print station 28 for printing thereon.

One aspect of this invention includes an apparatus 86 which is used to determine when the leading edge of the document 22 approaches the print station 28 and whether or not the leading edge is perpendicular to the guide wall 24. Another way of stating this alignment is that the document 22 must be moved in a feeding direction along a line which is parallel to the document path 26. If it is not moved in this direction, it becomes skewed relative to the traversing movement of the print head 34 and the platen 32 at the print station 28. If the document is skewed beyond acceptable tolerances, the printing effected by the print head 34 may not be positioned in the planned location on the document 22. When printing, the carriage 42 moves the print head 34 bi-directionally along a line which is along the platen 32. The carriage 42 is moved by a conventional carriage transport, with only the associated carriage motor 88 thereof being shown schematically in FIG. 4.

The apparatus 86 of this invention includes a first light source, like a light emitting diode (LED) 90, and a second light source or LED 92 which are mounted in spaced relationship in the lower or first guide 48 as shown in FIG. 2. The apparatus 86 also includes a first detector, like a phototransistor 94 and a second detector or phototransistor 96 which are mounted in spaced relationship in the upper or second guide 50 so as to be aligned with the first and second LEDs 90 and 92, respectively, when the top portion 14 is lowered and in the operative position shown in FIGS. 1 and 3. In the embodiment described, the first and second LEDs 90 and 92 are, for example, infra red light emitting diodes, and the first and second phototransistors 94 and 94 are complementary phototransistors. In effect, the first LED 90 and the associated phototransistor 94 form a first light source-detector pair, and the same is true of the second LED 92 and the associated phototransistor 96.

Figure 5:
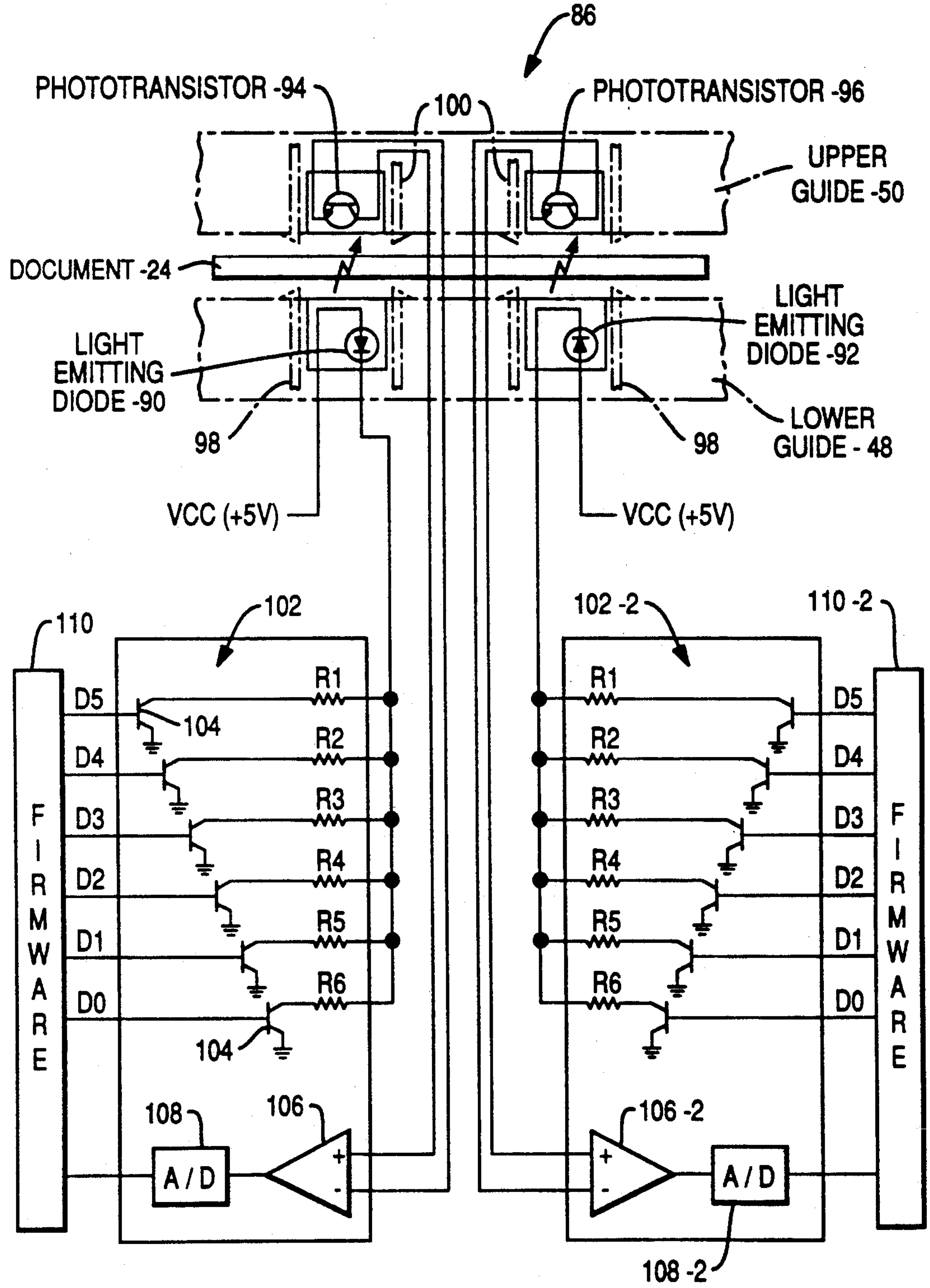
FIG. 5 is a schematic diagram showing a portion of the apparatus this invention.

The locations within the printer 10 (FIG. 2) of the LED's 90 and 92 and the associated phototransistors 94 and 96 are given as follows. The optical axis of each of the LEDs 90 and 92 is perpendicular to the lower or first guide 48, and these axes are on a line which is perpendicular to the guide wall 24. Each LED 90 and 92 is positioned in a conventional mount 98, with each of these mounts 98 being removably inserted into the lower or first guide 48 as shown in FIG. 5. Similarly, each of the phototransistors 94 and 96 is positioned in a conventional mount 100, with each of these mounts 100 being removably inserted into the upper or second guide 50 as shown in FIG. 5. The mounts 100 are located in the second guide 50 so that the optical axis of each associated phototransistor 94 and 96 is collinear with the optical axis of the associated LED 90 and 92. As alluded to previously herein, when the members of a light source-detector pair are mounted in separate moveable members, like bottom portion 12 and top portion 14, it is difficult to keep the LEDs 90 and 92 and the associated phototransistors 94 and 96, respectively, in alignment with each other. It is one of the features of this invention that even if there is some physical misalignment of the light source-transistor pairs mentioned, the apparatus 86 adjusts for such slight misalignment on start up of the printer 10. The LED 90 and 92 and the associated phototransistors 94 and 96, respectively, are spaced apart the same predetermined distance when the printer 10 is in the operating position shown in FIG. 3.

FIG. 5 shows additional details of the apparatus 86 which is used to detect the presence of the document 22 as it approaches the print station 28. Naturally, the exact location of the LEDs 90 and 92 and the phototransistors 94 and 96 relative to the associated work station or print station 28 is dependent upon a particular application. The apparatus 86 includes a first resistor network 102 which is placed in series with one terminal of the LED 90 whose remaining terminal is connected to a source of potential (VCC 5 Volts). The first resistor network 102 includes resistors R1 through R6, with the values of these resistors being shown in a RESISTOR CHART included at the end of the Description Of The Preferred Embodiment. Each resistor in the first resistor network 102 has a switching transistor 104 located in series with it and an energizing line. For example, energizing lines D5, D4, D3, D2, D1, and DO, when switched to a high level, will cause the associated resistors R1, R2, R3, R4, R5, and R6, respectively, to be switched in parallel with the LED 90. Naturally, when only energizing line D5 is at a high level, only resistor R1 of the network 102 will be in series with the LED 90. When one or more additional energizing lines is or are raised to an active or high level in addition to energizing line D5, the associated resistors, like R2 through R6, will be added in parallel to resistor R1, thereby lowering the resistance value of the resistance network 102, in steps, as shown in the RESISTOR CHART.

When sufficient light from the LED 90 reaches the phototransistor 94 (FIG. 5), a current is generated therein and is passed on to a converter or operational amplifier 106, and the output therefrom, is fed to an analog/digital (A/D) converter 108. The output of the A/D converter 108 is fed back to firmware 110. The firmware 110 contains the programs and sequences for controlling the operation of the apparatus 86, and may be stored in an EPROM 112 and certain data may be stored in a buffer (BUFFER) 114 shown in FIG. 4.

The controller 60 is shown in a schematic form so as to simplify a discussion of the operation thereof. The controller 60 also includes a RAM 116, the keyboard 18, the display 20, a microprocessor (MP) 118, a ROM 120, interfaces 122, 124, 126, and 128, with all these elements being interconnected by conventional interface and control logic 130. The interface 122 is used to couple the controller 60 to a Host Controller 132, if found necessary or desirable. The interface 124 is used to couple the controller 60 to the stepping motor 58; the interface 126 is used to couple the controller to the print head 34; and the interface 128 is used to couple the controller to the carriage motor 88. The controller 60 may be mounted on a circuit board 61 (FIG. 3) located in the bottom portion 12 of the printer 10.

The circuitry associated with the LED 92 and the phototransistor 96 (FIG. 5) is identical to that already discussed in relation to the LED 90 and the phototransistor 94. In this regard, the circuitry includes a second resistor network 102-2, resistors R1 through R6, energizing lines D0 through D5, an operational amplifier 106-2, an A/D converter 108-2, and firmware 110-2.

As stated earlier herein, one of the features of the apparatus 86 is that it is used to detect the leading edge of the document 22 as it approaches the print station 28. Another feature of this invention is that the associated sensors or phototransistors 94 and 96 are adjusted at "turn on" to detect a document 22 which is thin and may be made of onion skin, for example, or one which is thick, like a passbook used in financial institutions.

The adjusting of the phototransistor 94 (FIG. 5) is done, automatically, at each "turn on" and is performed in the following manner. The adjusting is performed with the top portion 14 and the bottom portion 12 in the operative position shown in FIG. 1. This is a feature in that stray light will not become a factor in the adjusting process. The sequencing of steps is controlled by the firmware 110 which is stored in the EPROM 112 and is also controlled by the controller 60. It is a feature of this invention that the phototransistors 94 and 96 are adjusted each time the printer 10 is turned on. Upon "turn on", the firmware 110 will place only resistor R1 in series with the LED 90 as step #1 from the first resistor network 102. In the embodiment described, resistor R1 is 2200 ohms; consequently, very little light will reach the phototransistor 94. Because there is no output from the phototransistor 94, the apparatus 86 "thinks" that there is a document 22 in the way. The firmware 102 will then go to the next step, which is step #2, which places only resistor R2 of the first resistor network 102 in series with the LED 90. With only resistor R2 in operation, sufficient light may reach the phototransistor 94 so that a small current may be generated thereby, pass through the operational amplifier 106, and be converted by the A/D converter 106 to be forwarded to the firmware 110. One of the features of this invention is that the sensitivity of the phototransistor 94 may be adjusted or made less sensitive, for example, by having the firmware add a few more steps of resistance after the phototransistor is first "turned on". In general, one or two extra steps adjust for the usual electrical noise which may be present in a terminal, like the printer 10. In the embodiment described, the automatic setting at the factory is dependent upon tolerances, alignment, and the like of the various elements described. These automatic settings made at factory fall into the range of step #5 to step #17 in the Resistor Chart for essentially all of the document thicknesses anticipated by the printer 10. Naturally, the number of extra steps of resistance added is dependent upon a particular application. As seen from the Resistor Chart, Step #10 reads R211 R6; this is read as resistor R2 being in parallel with resistor R6.

After the first detector or transistor 94 (FIG. 5) is set as described, the second detector or phototransistor 96 may be set in the same manner. It is a feature of this invention that the phototransistors 94 and 96 may be set in exactly the same manner, and that these phototransistors can be set independently of each other. Because, at times, the top portion 14 is moved away from the bottom portion 12 of the printer 10, there may not be an identical fit compared what it was previously. Because the adjusting of the phototransistors 94 and 96 is performed each time the printer 10 is turned on, each one of these phototransistors is adjusted independently to compensate for misalignment, if any, which may have occurred. The apparatus 86 also adjusts for any misalignment related to the optical axes of the LEDs 90 and 92 and their associated phototransistors 94 and 96.

When an operator of the printer 10 wishes to print on a document 22, the right side of the document 22 (as viewed in FIG. 1) is moved against the guide wall 24, and the document 22 is moved along the document path 26 towards the print station 28. Assuming that the document 22 is moved in an aligned manner as described both of the phototransistors 94 and 96 will be actuated or turned off at the same time, producing first and second signals, respectively, giving an indication that the leading edge of the document is properly located at the print station 28. The indication may be given by a "Document Present" message appearing on the display 20. The operator then enters the data and the location on the document 22 as to where the data is to be printed. Naturally, the exact sequence of steps to be followed is dependent upon the particular application software associated with the controller 60. An Enter key on the keyboard 18 may be actuated to energize the feeding means 52 to move the document 22 in the feeding direction until the selected area on the document 22 is positioned at the print station 28. In this regard, the stepping motor 58 is indexed a predetermined number of times to effect the locating. Thereafter, the print head 34 and carriage motor 88 are energized to effect the printing. After printing, the stepping motor 58 is energized in the reverse direction to move the document 22 out of the printer 10 in the example being described.

A feature of this invention is that the apparatus 86 may be used to detect skewness of the document 22 as it is moved towards the print station 28. When skewness of a document being fed to the print station 28 occurs, it means that the leading edge of the document 22 is not perpendicular to the guide wall 24 or parallel to the platen 32, for example. When this skewness occurs, it means that one of the phototransistors 94 or 96 will give an indication that a document is present prior to the other one giving such an indication. The software associated with the controller 60, which may reside in the EPROM 112, for example, counts the number of steps made by the stepping motor 58 between document present outputs from the phototransistors 94 and 96 as the document 22 is moved towards the print station 28. The number of steps made by the stepping motor 58 as described in the previous sentence, provides a measure of the skewness of the leading edge of the document 22 relative to the print station 28. Naturally, the number of steps being indicative of skewness depends upon the geometry of the working location or print station 28. Factors such as the distance between the phototransistors, the dimension of each step of the stepping motor 58, and the size of the document 22. A first predetermined number of steps (representing skewness) may be considered as an acceptable degree of skewness, while a second predetermined number may be considered as an unacceptable skewness. The first and second predetermined numbers may be displayed on the display 20 either as "raw numbers", or these numbers may be translated into "user friendly" terms to be displayed on the display 20. An unacceptable amount of skewness may translate to a display term like "Reinsert Document".

Another feature of this invention is that it provides a method of determining the probable life of a detector (like phototransistor 94 in FIG. 5) used in association with a light source (like LED 90). In this regard, the method comprises the following steps:

(a) using a stepped resistor network (like 102 in FIG. 5) coupled to a light source (like LED 90) to determine at what resistance step in said stepped resistor network that current flows through said light source to generate an output from said detector;

(b) comparing the resistance step obtained from step (a) with an initial resistance step obtained from an initial set up in which current flowed through said light source to generate an output from said detector; and (c) determining that the probable life of the detector has been reached when the resistance step determined from step (a) reflects a lower resistance which is a predetermined number of resistance steps away from the initial resistance step derived from the initial set up.

As previously stated, the initial range of values obtained at the factory for the printer 10 in which the apparatus 86 is used varies from Step 5 to Step 17 of the Resistor Chart located hereinafter. Each time that the printer 10 is turned one, the phototransistors 94 and 96 are adjusted as previously explained. The particular step at which each phototransistor 94 and 96 is adjusted at start up of the printer 10 is stored in the buffer 114 of the controller 60, for example. The particular Step # stored in the buffer 114 may be displayed on the display 20 by the controller 60 for such a request entered upon the keyboard 18. As an illustration, if the initial set up of the phototransistor 94 is Step 10, and the particular step stored in the buffer 114 indicates a current setting at Step 20, for example, it could indicate that the phototransistor 94 is approaching the end of its useful life.

RESISTOR CHART

| Step No. | Resistors | Skew - Source |
|---|---|---|
| 1 | R1 = | 2200.00 ohms |
| 2 | R2 = | 1500.00 ohms |
| 3 | R3 = | 1200.00 ohms |
| 4 | R4 = | 1000.00 ohms |
| 5 | R5 = | 820.00 ohms |
| 6 | R1//R4 = | 687.50 ohms |
| 7 | R1//R5 = | 597.35 ohms |
| 8 | R3//R4 = | 545.45 ohms |
| 9 | R3//R5 = | 487.13 ohms |
| 10 | R2//R6 = | 467.89 ohms |
| 11 | R1//R3//R4 = | 437.09 ohms |
| 12 | R2//R3//R4 = | 400.00 ohms |
| 13 | R1//R4//R5 = | 373.96 ohms |
| 14 | R2//R4//R5 = | 346.48 ohms |
| 15 | R3//R4//R5 = | 327.56 ohms |
| 16 | R1//R5//R6 = | 318.00 ohms |
| 17 | R2//R5//R6 = | 297.91 ohms |
| 18 | R2//R3//R4//R5 = | 268.85 ohms |
| 19 | R1//R2//R3//R4//R5 = | 239.58 ohms |
| 20 | R2//R4//R5//R6 = | 229.53 ohms |
| 21 | R1//R2//R3//R5//R6 = | 215.30 ohms |
| 22 | R1//R3//R4//R5//R6 = | 200.88 ohms |
| 23 | R1//R2//R3//R4//R5//R6 = | 177.16 ohms |

What is claimed is:

1. A machine method of determining the probable life of a detector used in association with a light source, comprising the steps:

(a) using a stepped resistor network coupled to said light source to determine at what resistance step in said stepped resistor network that current flows through said light source to generate an output from said detector;

(b) comparing the resistance step obtained from step (a) with an initial resistance step obtained from an initial set up in which current flowed through said light source to generate an output from said detector; and (c) determining that the probable life of the detector has been reached when the resistance step determined from step (a) reflects a lower resistance which is a predetermined number of resistance steps away from the initial resistance step derived from the initial set up.

2. The machine method as claimed in claim 1 in which said using step is effected through using a processor and instructions stored in a memory.

* * * * *